(12) United States Patent
Dinerman et al.

(10) Patent No.: US 11,408,533 B2
(45) Date of Patent: Aug. 9, 2022

(54) SOLENOID VALVE WITH SLIDE FORMED IN TWO PARTS

(71) Applicant: Robert Bosch GmbH, Stuttgart (DE)

(72) Inventors: Michael Dinerman, Heilbronn (DE); Michael Reichert, Vaihingen An der Enz (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 16/924,679

(22) Filed: Jul. 9, 2020

(65) Prior Publication Data

US 2021/0010611 A1    Jan. 14, 2021

(30) Foreign Application Priority Data

Jul. 11, 2019 (DE) .................. 102019210284.0

(51) Int. Cl.
*F16K 31/06* (2006.01)
*F16K 1/38* (2006.01)
*F16K 1/36* (2006.01)
*B60T 8/36* (2006.01)

(52) U.S. Cl.
CPC ........ *F16K 31/0675* (2013.01); *B60T 8/3615* (2013.01); *F16K 1/36* (2013.01); *F16K 1/38* (2013.01); *F16K 31/061* (2013.01)

(58) Field of Classification Search
CPC . F16K 1/36; F16K 1/38; F16K 25/005; F16K 31/0655; F16K 31/0665; F16K 31/0675; B60T 8/3615; B60T 8/686
See application file for complete search history.

(56) References Cited

U.S. PATENT DOCUMENTS

| | | | | |
|---|---|---|---|---|
| 6,007,049 A * | 12/1999 | Wass | ................ | F16K 1/302 |
| | | | | 251/144 |
| 6,737,766 B1 * | 5/2004 | Burrola | ............ | F16K 31/0655 |
| | | | | 123/516 |
| 7,168,679 B2 * | 1/2007 | Shi | ................ | B60T 8/363 |
| | | | | 251/129.02 |
| 7,938,381 B2 * | 5/2011 | Takahashi | ........ | F16K 31/0665 |
| | | | | 251/129.02 |
| 10,151,397 B2 * | 12/2018 | Mann, III | ........ | F16K 27/0254 |

(Continued)

FOREIGN PATENT DOCUMENTS

| | | |
|---|---|---|
| CN | 108119658 A | 6/2018 |
| DE | 10 2016 201 474 A1 | 8/2017 |
| DE | 10 2016 205 988 A1 | 10/2017 |

*Primary Examiner* — Matthew W Jellett
(74) *Attorney, Agent, or Firm* — Maginot, Moore & Beck LLP

(57) ABSTRACT

A solenoid valve includes a magnet assembly and a valve cartridge having an armature guided movably inside a capsule, a valve insert, a slide which is guided movably inside the valve insert and has a closing element and a sealing element, and a valve body with a valve seat. A main valve includes the sealing element and the valve seat. The slide is formed in two parts with the sealing element as the first part and the closing element as the second part. When the valve is not energized, the valve is open, and when the valve is energized, the sealing element seals in the valve seat. The sealing element and the closing element are made of different materials, and the material of the sealing element allows a partial elasticity of the slide while the material of the closing element allows a partial stiffness of the slide.

13 Claims, 3 Drawing Sheets

(56) References Cited

U.S. PATENT DOCUMENTS

| | | | |
|---|---|---|---|
| 10,184,578 B2* | 1/2019 | Shreve | F16K 15/021 |
| 10,619,744 B2* | 4/2020 | Glime, III | F16K 1/48 |
| 10,738,893 B2* | 8/2020 | Haeusser | F16K 1/32 |
| 2002/0117644 A1* | 8/2002 | Carrillo | F16K 31/0655 |
| | | | 251/129.08 |
| 2005/0001190 A1 | 1/2005 | Shirase et al. | |
| 2007/0001137 A1* | 1/2007 | Kingsford | F16K 1/54 |
| | | | 251/122 |
| 2015/0129057 A1 | 5/2015 | Shreve et al. | |

* cited by examiner

SOLENOID VALVE WITH SLIDE FORMED IN TWO PARTS

This application claims priority under 35 U.S.C. § 119 to patent application no. DE 10 2019 210 284.0, filed on Jul. 11, 2019 in Germany, the disclosure of which is incorporated herein by reference in its entirety.

The present disclosure concerns a solenoid valve, having a magnet assembly and a valve cartridge comprising an armature which is guided movably inside a capsule, a valve insert, a slide which is guided movably inside the valve insert and has a closing element and a sealing element, and a valve body with a valve seat, wherein a main valve is arranged between a fluid inlet and a fluid outlet and comprises the sealing element of the slide and the valve seat arranged in the valve body, wherein the slide is formed in two parts and the sealing element is designed as the first part and the closing element as the second part, wherein when the solenoid valve is not energized, a return spring acts on the slide and the armature and sets an opening gap at the main valve, and when the solenoid valve is energized, a magnetic force generated by the magnet assembly moves the armature and the slide in the direction of the valve seat, and the sealing element is inserted with sealing effect in the valve seat in order to execute a sealing function. The solenoid valve is characterized in that the sealing element and the closing element are made of different materials, wherein the material of the sealing element allows a partial elasticity of the slide and wherein the material of the closing element allows a partial stiffness of the slide.

BACKGROUND

FIG. 1 shows a solenoid valve from the prior art which is used for example in an anti-lock braking system (ABS) or a traction control system (ASR) or an electronic stability program system (ESP). As evident from FIG. 1, a normally open solenoid valve 1 comprises a magnet assembly 2 for generating a magnetic flux, having a housing casing 2.1, a winding carrier 2.2, a coil winding 2.3 and a cover plate 2.4, and a valve cartridge 5 which comprises a capsule 5.1, a valve insert 10 connected to the capsule 5.1 via a sealing weld 4, an armature 6 with a closing element 7 and a return spring 8. The slide 7 is formed in one piece and comprises the two regions of the closing element 7.1 and the sealing element 7.2. The slide 7 is here formed from a non-magnetic material, e.g. a non-magnetic metal or a reinforced plastic, such as e.g. PEEK 450CF30. When the coil winding 2.3 is energized via electrical connections 2.5, the magnet assembly 2 generates a magnetic force which activates the longitudinally movable armature 6 and moves this together with the slide 7 up to the valve insert 10 against the force of the return spring 8. The valve insert 10 conducts the magnetic flux, introduced by the magnet assembly 2 via the cover plate 2.4, axially towards the armature 6 via an air gap 3.

The valve insert 10 also receives the so-called valve body 11 that has a valve seat 11.1 in which the sealing element 7.2, configured as a sealing cap, is inserted with sealing effect in order to implement the sealing function of the solenoid valve 1. For caulking with a fluid block, a caulking flange 9 is molded onto the valve insert 10.

The prior art includes for example patent application DE 10 2016 205 988 A1. This document describes a valve armature for a solenoid valve, with a base body and a slide cooperating with a valve seat, wherein the base body and the slide are connected together via a connecting device, and a solenoid valve with such a valve armature. Here, the connecting device comprises at least a first locking element arranged on the slide and at least a second locking element arranged on the base body, wherein the locking elements constitute a form-fit and/or force-fit locking connection.

The prior art also includes patent application DE 10 2016 201 474 A1. This document describes a valve armature for a solenoid valve, with a base body and a slide cooperating with a valve seat, and a valve cartridge with such a valve armature. Here, a damping device is arranged between the slide and the base body, with a cavity which can be filled with a damping medium, and a choke opening through which the damping medium flows out of the cavity or into the cavity, wherein the damping device damps a pulse which occurs when the slide meets the valve seat.

SUMMARY

Advantageously however, the solenoid valve according to the disclosure allows optimized functionality, in particular an improved tightness at low and high pressures. This is achieved according to the disclosure by the features described herein. Further embodiments of the disclosure are the subject the following disclosure.

The solenoid valve according to the disclosure has a magnet assembly and a valve cartridge comprising an armature which is guided movably inside a capsule, a valve insert, a slide which is guided movably inside the valve insert and has a closing element and a sealing element, and a valve body with a valve seat, wherein a main valve is arranged between a fluid inlet and a fluid outlet and comprises the sealing element of the slide and the valve seat arranged in the valve body, wherein the slide is formed in two parts and the sealing element is designed as the first part and the closing element as the second part, wherein when the solenoid valve is not energized, a return spring acts on the slide and the armature and sets an opening gap at the main valve, and when the solenoid valve is energized, a magnetic force generated by the magnet assembly moves the armature and the slide in the direction of the valve seat, and the sealing element is inserted with sealing effect in the valve seat in order to execute a sealing function; said solenoid valve is characterized in that the sealing element and the closing element are made of different materials, wherein the material of the sealing element allows a partial elasticity of the slide and wherein the material of the closing element allows a partial stiffness of the slide.

This means that in a normally open solenoid valve, two regions of the slide are defined which have different properties. The respective properties are defined by the materials used. Thus the first region (the closing element) has a high stiffness. In other words, the first region allows a good strength or form stability of the slide. This guarantees good stability. The result is an improvement in function, in particular an optimization of the tightness when retaining high pressures. In contrast, the second region (the sealing element) has a high elasticity. In other words, the second region allows a good flexibility or deformity of the slide. This guarantees a good seal. This results in an improved function of the valve, in particular an optimization of the tightness in the low-pressure range.

Advantageously, the disclosure thus allows an increase in quality and a permanent improvement in the tightness of the solenoid valve, thanks to the optimum combination of stiffness—with respect to minimizing the length changes resulting from the applied connection forces—and the elasticity in the seat, and achieves better functionality with respect to pressure retention (higher closing forces due to rising magnetic force with small residual air gap), and also saves component costs and weight. Also, the lower weight and the elastic cap reduce noise development on switching of the valve.

For this, the sealing element is formed in two parts, wherein the two regions are made from different materials. The first region of the slide (closing element) here consists of a stiffer material, for example PEEK 450CF30, and is connected (e.g. by press connection, bonding etc.) to a more elastic second region of the slide (sealing element or sealing cap) which is made of a softer plastic, for example non-reinforced PEEK 450G. The two-part slide is situated between the armature and the valve seat. The stiffness necessary to achieve very small residual air gaps and hence improve the function is ensured by the stiffer part, and the seal is ensured by the softer sealing cap. In this context, a functional separation is achieved by the use of two components (closing element and sealing element) comprising a stiff and a soft material.

In an advantageous embodiment, the solenoid valve is characterized in that the sealing element is made of non-reinforced polyether ether ketone, and the closing element is made of reinforced polyether ether ketone, in particular of carbon-fiber-reinforced polyether ether ketone.

This means that the slide is made from the material polyether ether ketone. The smaller the residual air gap, the higher the closing forces in the solenoid valve. This proposed material pairing allows very small residual air gaps to be achieved in the function setting process, which leads to an improved function of "pressure retention" (when the solenoid valve is energized, a higher pressure can be retained) because of the higher magnetic forces. Furthermore, advantageously a cost saving is achieved because of the injection-molding production process (injection-molded parts) in comparison with steel parts. The lower weight in comparison with metallic components leads to further advantages with respect to the switching time of the valve and an improvement in noise development on switching of the valve.

For example, the closing element consists of reinforced PEEK 450CF30 and the sealing element consists of non-reinforced PEEK 450G. The two-part design and the materials used lead to a lighter and cheaper slide, which offers both a high stiffness for function improvement (retention of high pressures) and a good tightness in the solenoid valve in the low-pressure region.

In a possible embodiment, the solenoid valve is characterized in that the solenoid valve is designed for high fluid volume flows, in particular the diameter of the opening of the valve seat is greater than 30% of the diameter of the valve body.

A solenoid valve as a technical component serves to control the inlet or outlet of gases or fluids, or to control and regulate the flow direction. To achieve the necessary braking effect, a high pressure build-up dynamic of the brake control system is required, and hence a high volume flow through certain solenoid valves. In order to achieve a corresponding volume flow, a large valve seat is necessary, and at the same time a suitable material pairing in the seat in order to achieve the required tightness. For the sealing element, a relatively stiff material is required, but in the valve seat an elastic material is required, in order to ensure the valve functions such as pressure retention, switching etc., and ensure that the armature never goes to block with the valve insert beyond tolerance, and to achieve the high tightness. Advantageously, an opening diameter of the valve of 30% of the valve body is used. Evidently, larger opening diameters may also be used. For example, an opening diameter of the valve seat of 50% or more of the diameter of the valve body is advantageous.

In a preferred embodiment, the solenoid valve is characterized in that the sealing element and the closing element are connected by means of a connection, wherein the connection defines a position of the sealing element in relation to the closing element.

This means that the slide indeed comprises two different components, but these components are joined together so that the slide is present as an integral whole. The connection between the two components may e.g. be a force-fit and/or form-fit connection. The joining regions of the two components are configured with correspondingly opposing congruence, for example as a cone and hollow cone, or a cylinder and hollow cylinder. Furthermore for example, a stop is conceivable on one of the components or on both components.

In an alternative refinement, the solenoid valve is characterized in that the sealing element and the closing element are connected together by means of a variable-length connection, wherein the connection allows an adjustment of the position of the sealing element and the closing element relative to each other.

This means that the positions of the two components can be adjusted on joining. This is achieved for example with a press fit of a cylinder into a hollow cylinder. During the mounting process, the cylinder is pressed into the hollow cylinder up to the desired position. Thus the length of the slide may be configured precisely. In this way, for example, the position of the sealing tip of the sealing element in the finally mounted state in the valve may be set (and hence the through-flow quantity in non-energized state).

In an advantageous embodiment, the solenoid valve is characterized in that the sealing element and the closing element are connected by means of a permanent connection, in particular by bonding.

This means that the slide consists of two components, but the two components are permanently joined together e.g. during mounting. The slide is thus formed correspondingly integrally but consists of two different materials with the functional properties corresponding to the regions.

In a possible embodiment, the solenoid valve is characterized in that the sealing element is configured the form of a cap.

This means that the sealing element is configured in the form of a dome or inverted dish. Such a cap surrounds a protrusion on the sealing element. The inner contour of the cap is designed according to the protrusion of the closing element, e.g. as a hollow cylinder for a cylindrical protrusion. The outer contour of the cap is designed according to the valve seat and the requirements and specifications of the valve. Advantageously, using e.g. established connecting elements, standardized modular solutions may be developed for the closing element and sealing element, and these may be combined variably depending on the application.

In a preferred refinement, the solenoid valve is characterized in that the closing element has a stop for contact with the sealing element, and in particular the sealing element has a counter-stop for setting the positions of the sealing element and closing element relative to each other.

This means that the closing element has a structural stop. On joining together, the sealing element is positioned accordingly at the stop. Advantageously, the desired length of the slide may thus be set with great precision. Furthermore, during product insertion, the stop prevents a change in the relative positions of the two components. Advantageously, a corresponding counter-stop is formed on the sealing element in order to allow an exact setting in a simple fashion.

In an alternative embodiment, the solenoid valve is characterized in that a cavity is formed in the axial direction between the closing element and the sealing element, allowing an elastic deformation of the sealing element in performance of the sealing function.

This means that a cavity is defined and formed between the outer contour of the closing element and the inner contour of the sealing element. This cavity allows a certain degree of deformation of the sealing element. This deformation may, for example when the slide stops on the valve seat, allow a dissipation of the kinetic energy and damp the stop. This may achieve an optimization of the noise and vibration behavior.

BRIEF DESCRIPTION OF THE DRAWINGS

It is pointed out that the features listed individually in the description may be combined with each other in any technically sensible fashion and indicate further embodiments of the disclosure. Further features and applications of the disclosure arise from the description of exemplary embodiments shown in the attached figures.

The figures show.

DETAILED DESCRIPTION

Figure 1:
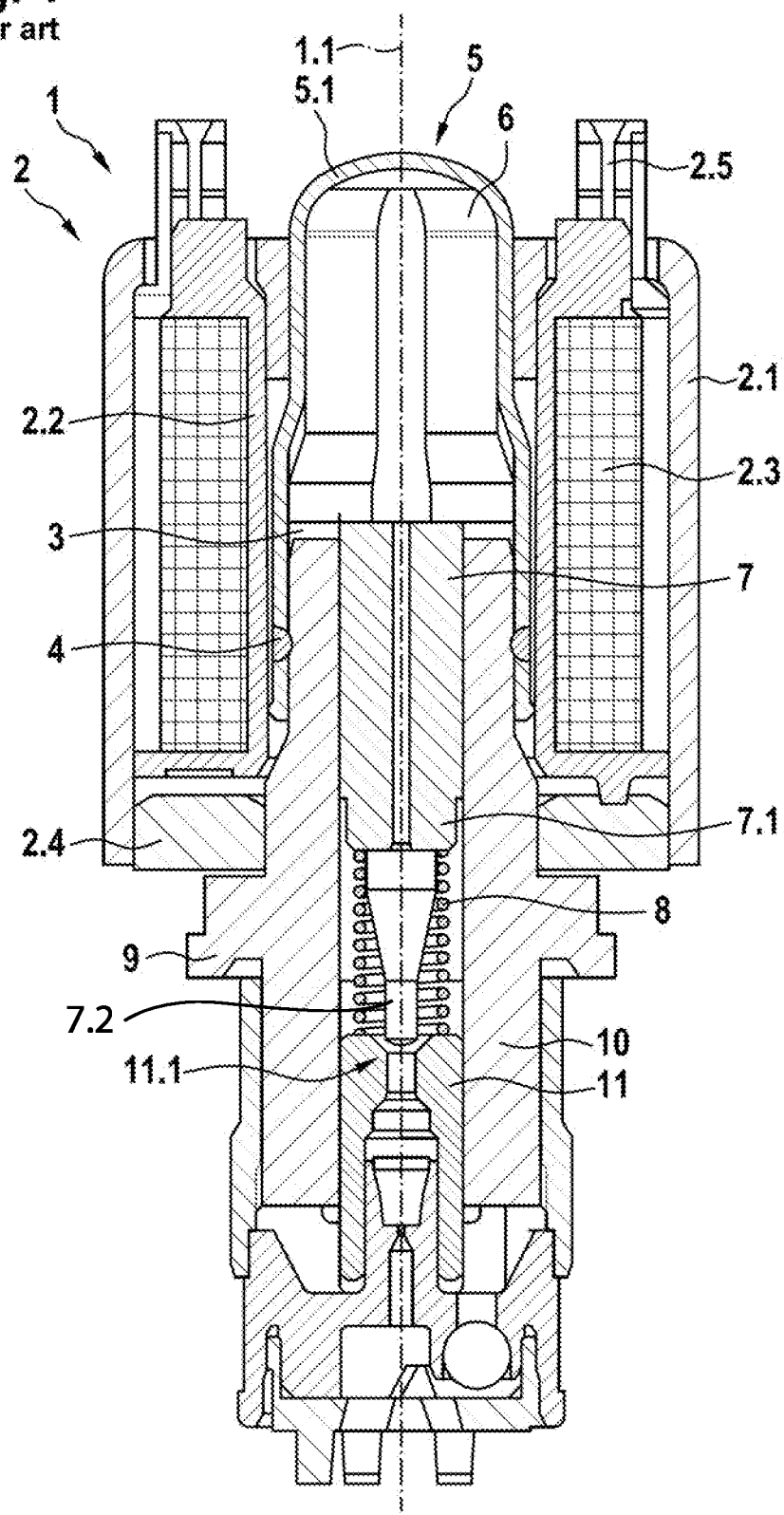
FIG. 1 a diagrammatic sectional view of a solenoid valve.
Figure 2:
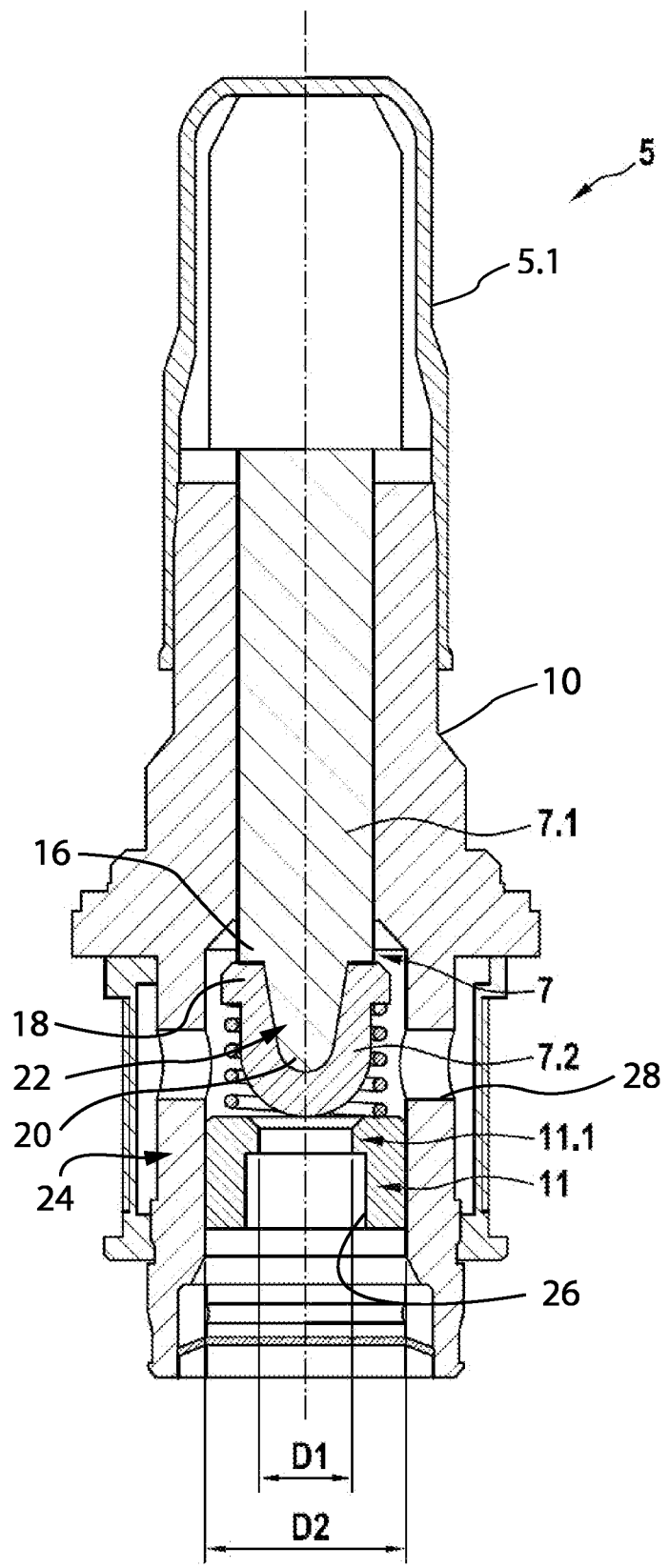
FIG. 2 a detail depiction of an embodiment of the disclosure.

FIG. 2 shows a detail depiction of an embodiment of the valve cartridge 5 with a cap-like sealing element 7.2. This shows in detail the valve cartridge 5 with the components already described with respect to FIG. 1 including a capsule 5.1 and a valve insert 10. In contrast to the valve cartridge 5 of FIG. 1, the slide 7 shown in FIG. 2 is formed from two components, namely the closing element 7.1 and the sealing element 7.2. The closing element 7.1 has a conical protrusion 20. The sealing element 7.2 correspondingly has a hollow conical inner contour 22. Furthermore, a stop 16 of the closing element 7.1 and a counter-stop 18 of the sealing element 7.2 are shown. The two components are permanently joined together during the mounting process. For this, the two components have been bonded together. Furthermore, the valve body 11 with valve seat 11.1 is shown. It is clearly evident here that the main valve 24 (including at least the sealing element 7.2 and the valve seat 11.1) is designed for a high volume flow. The main valve 24 is arranged between a fluid inlet 26 and a fluid outlet 28. In detail, the diameter D1 of the opening of the valve seat 11.1 here amounts to around 50% of the diameter D2 of the valve body.

Figure 3:
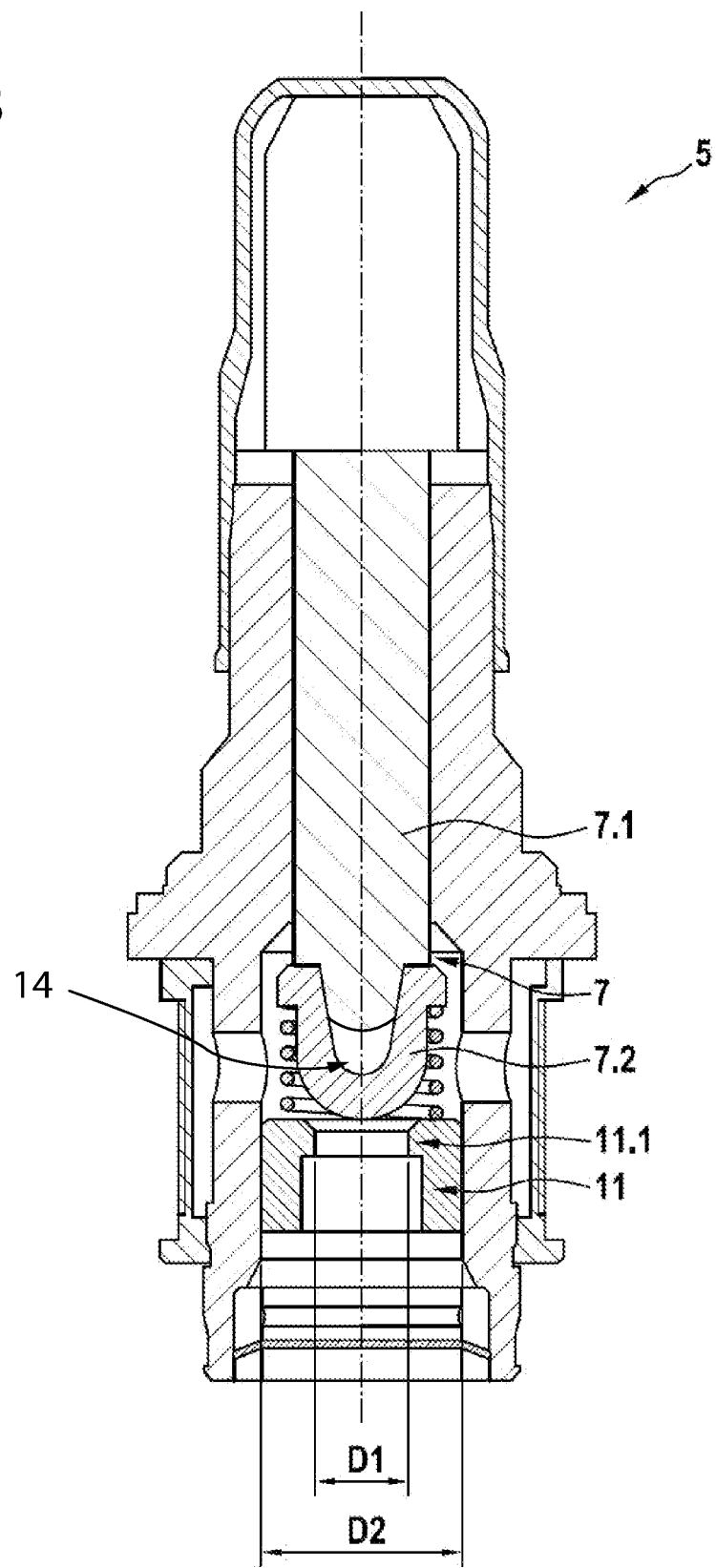
FIG. 3 a detail depiction of another embodiment of the disclosure.

As shown in FIG. 3, in an alternative embodiment, the valve cartridge 5 is characterized in that a cavity 14 is formed in the axial direction between the closing element 7.1 and the sealing element 7.2, allowing an elastic deformation of the sealing element 7.2 in performance of the sealing function.

This means that the cavity 14 is defined and formed between the outer contour of the closing element 7.1 and the inner contour of the sealing element 7.2. This cavity 14 allows a certain degree of deformation of the sealing element 7.2. This deformation may, for example when the slide 7 stops on the valve seat 11.1, allow a dissipation of the kinetic energy and damp the stop. This may achieve an optimization of the noise and vibration behavior.

The invention claimed is:

1. A solenoid valve, comprising:
a magnet assembly; and
a valve cartridge comprising:
an armature which is guided movably inside a capsule;
a valve insert;
a slide which is guided movably inside the valve insert and has a closing element and a sealing element; and
a valve body with a valve seat,
wherein a main valve is arranged between a fluid inlet and a fluid outlet and comprises the sealing element of the slide and the valve seat of the valve body,
wherein the slide is formed in two parts, the sealing element configured as a first part of the two parts and the closing element configured as a second part of the two parts,
wherein, when the solenoid valve is not energized, a return spring acts on the slide and the armature and sets an opening gap at the main valve, and when the solenoid valve is energized, a magnetic force generated by the magnet assembly moves the armature and the slide in a direction toward the valve seat such that the sealing element is inserted with sealing effect in the valve seat to execute a sealing function,
wherein the sealing element is formed of a first material that allows a partial elasticity of the slide and the closing element is formed of a second material that allows a partial stiffness of the slide, the first and second materials being different materials,
wherein a cavity is defined between an outer contour of the closing element and an inner contour of the sealing element, and
wherein at least a portion of the sealing element is configured to elastically deform into the cavity when the sealing element is inserted with the sealing effect.

2. The solenoid valve according to claim 1, wherein the first material, which forms the sealing element, is non-reinforced polyether ether ketone, and the second material, which forms the closing element, is reinforced polyether ether ketone.

3. The solenoid valve according to claim 1, wherein the solenoid valve is configured for high fluid volume flows.

4. The solenoid valve according to claim 1, wherein the sealing element and the closing element are connected by a connection that defines a position of the sealing element in relation to the closing element.

5. The solenoid valve according to claim 1, wherein the sealing element and the closing element are connected together by a variable-length connection that allows an adjustment of positions of the sealing element and the closing element relative to each other.

6. The solenoid valve according to claim 1, wherein the sealing element and the closing element are connected by a permanent connection.

7. The solenoid valve according to claim 1, wherein the sealing element is configured in the form of a cap.

8. The solenoid valve according to claim 1, wherein the closing element has a stop configured to contact with the sealing element.

9. The solenoid valve according to claim 3, wherein a diameter of an opening of the valve seat is greater than 30% of a diameter of the valve body.

10. The solenoid valve according to claim 6, wherein the sealing element and the closing element are bonded to one another.

11. The solenoid valve according to claim 8, wherein the sealing element has a counter-stop for setting of positions of the sealing element and closing element relative to each other.

12. The solenoid valve according to claim 1, wherein:
the valve body is received by a cylindrical support opening of the valve insert,
the valve seat defines a valve seat surface against which the sealing element is positioned when the sealing element is inserted with the sealing effect, and
the valve seat surface defines a seat opening having a diameter that is greater than 50% of a diameter of the cylindrical support opening.

13. A solenoid valve, comprising:
a magnet assembly; and
a valve cartridge comprising:
 an armature which is guided movably inside a capsule;
 a valve insert;
 a slide which is guided movably inside the valve insert and has a closing element and a sealing element; and
 a valve body with a valve seat,
wherein a main valve is arranged between a fluid inlet and a fluid outlet and comprises the sealing element of the slide and the valve seat of the valve body, wherein the slide is formed in two parts, the sealing element configured as a first part of the two parts and the closing element configured as a second part of the two parts, wherein, when the solenoid valve is not energized, a return spring acts on the slide and the armature and sets an opening gap at the main valve, and when the solenoid valve is energized, a magnetic force generated by the magnet assembly moves the armature and the slide in a direction toward the valve seat such that the sealing element is inserted with sealing effect in the valve seat to execute a sealing function, wherein the sealing element is formed of a first material that allows a partial elasticity of the slide and the closing element is formed of a second material that allows a partial stiffness of the slide, the first and second materials being different materials, wherein the first material, which forms the sealing element, is non-reinforced polyether ether ketone, and the second material, which forms the closing element, is reinforced polyether ether ketone, and wherein the second material is carbon-fiber-reinforced polyether ether ketone.

\* \* \* \* \*